United States Patent
Leibovici et al.

(10) Patent No.: US 10,826,795 B2
(45) Date of Patent: Nov. 3, 2020

(54) ARCHITECTURE FOR IMPLEMENTING SERVICE LEVEL MANAGEMENT FOR A VIRTUALIZATION ENVIRONMENT

(71) Applicant: Nutanix, Inc., San Jose, CA (US)

(72) Inventors: Andre Leibovici, Mountain View, CA (US); Binny Sher Gill, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 716 days.

(21) Appl. No.: 14/704,958

(22) Filed: May 5, 2015

(65) Prior Publication Data

US 2020/0036602 A1    Jan. 30, 2020

Related U.S. Application Data

(60) Provisional application No. 61/988,803, filed on May 5, 2014.

(51) Int. Cl.
*H04L 12/24* (2006.01)
*G06F 9/455* (2018.01)

(52) U.S. Cl.
CPC ...... *H04L 41/5022* (2013.01); *G06F 9/45558* (2013.01); *G06F 2009/45595* (2013.01)

(58) Field of Classification Search
CPC ............. H04L 41/5022; G06F 9/45558; G06F 9/45545
USPC ........................................................ 709/223
See application file for complete search history.

(56) References Cited

U.S. PATENT DOCUMENTS

| | | | | |
|---|---|---|---|---|
| 7,603,529 B1 * | 10/2009 | MacHardy | ............ | G06F 3/0608 707/999.202 |
| 7,945,640 B1 * | 5/2011 | VanTine | ................ | G06F 3/0605 709/217 |
| 8,477,610 B2 * | 7/2013 | Zuo | ......................... | H04L 47/20 370/230 |
| 8,549,518 B1 | 10/2013 | Aron et al. | | |
| 8,601,473 B1 | 12/2013 | Aron et al. | | |
| 8,638,799 B2 * | 1/2014 | Mudigonda | ......... | G06F 9/45558 370/395.21 |
| 8,667,207 B2 * | 3/2014 | Knowles | ............... | G06F 9/5077 711/6 |
| 8,850,130 B1 * | 9/2014 | Aron | ......................... | G06F 9/52 711/150 |
| 8,898,304 B2 * | 11/2014 | Hadar | ................. | G06F 9/45558 709/223 |

(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — Vivek Srivastava
*Assistant Examiner* — Binod J Kunwar
(74) *Attorney, Agent, or Firm* — Vista IP Law Group, LLP

(57) ABSTRACT

Disclosed is an improved approach to implement a management environment for the storage infrastructure of a virtualization system. The invention provides the ability at a granular basis to allow a user/administrator to configure and control the service levels for virtualization objects in a virtualization system, particularly for storage-related components.

20 Claims, 14 Drawing Sheets

(56) References Cited

U.S. PATENT DOCUMENTS

| | | | |
|---|---|---|---|
| 8,949,825 B1* | 2/2015 | Fitzgerald | G06F 9/45537 718/1 |
| 8,949,826 B2* | 2/2015 | Fitzgerald | G06F 9/45537 718/1 |
| 8,954,393 B1* | 2/2015 | Botes | G06F 16/185 707/651 |
| 8,997,097 B1 | 3/2015 | Aron et al. | |
| 9,015,703 B2* | 4/2015 | Fitzgerald | G06F 9/45537 718/1 |
| 9,052,936 B1 | 6/2015 | Aron et al. | |
| 9,058,198 B2* | 6/2015 | McGrath | G06F 9/45558 |
| 9,256,374 B1 | 2/2016 | Aron et al. | |
| 9,256,475 B1 | 2/2016 | Aron et al. | |
| 9,354,912 B1 | 5/2016 | Aron et al. | |
| 9,372,789 B2 | 6/2016 | Minckler et al. | |
| 9,377,953 B2 | 6/2016 | Fornander et al. | |
| 9,389,887 B1 | 7/2016 | Aron et al. | |
| 9,507,537 B2 | 11/2016 | Wright et al. | |
| 9,529,996 B2* | 12/2016 | Qureshi | G06F 21/53 |
| 9,558,073 B2 | 1/2017 | Cantwell et al. | |
| 9,575,784 B1 | 2/2017 | Aron et al. | |
| 9,619,257 B1 | 4/2017 | Aron et al. | |
| 9,712,401 B2 | 7/2017 | Wright et al. | |
| 9,772,866 B1 | 9/2017 | Aron et al. | |
| 9,798,489 B2* | 10/2017 | Lakshman | G06F 3/065 |
| 9,838,269 B2 | 12/2017 | Wright et al. | |
| 2006/0225065 A1* | 10/2006 | Chandhok | G06F 11/1458 717/168 |
| 2007/0250833 A1* | 10/2007 | Araujo, Jr. | G06F 21/6218 718/1 |
| 2007/0266383 A1* | 11/2007 | White | G06F 9/4856 718/1 |
| 2008/0134176 A1* | 6/2008 | Fitzgerald | G06F 9/45537 718/1 |
| 2008/0209016 A1* | 8/2008 | Karve | G06F 8/61 709/221 |
| 2008/0301770 A1* | 12/2008 | Kinder | H04L 63/0823 726/2 |
| 2010/0070970 A1* | 3/2010 | Hu | G06F 9/45533 718/1 |
| 2013/0139155 A1* | 5/2013 | Shah | G06F 9/45558 718/1 |
| 2013/0227145 A1 | 8/2013 | Wright et al. | |
| 2014/0201157 A1* | 7/2014 | Pawar | G06F 16/21 707/654 |
| 2014/0331061 A1 | 11/2014 | Wright et al. | |
| 2014/0344809 A1* | 11/2014 | Jin | G06F 9/455 718/1 |
| 2015/0067683 A1* | 3/2015 | Robinson | G06F 21/53 718/1 |
| 2015/0199388 A1* | 7/2015 | Hrischuk | G06F 17/30289 707/802 |
| 2015/0201017 A1* | 7/2015 | Hrischuk | H04L 67/1097 709/226 |
| 2015/0244795 A1 | 8/2015 | Cantwell et al. | |
| 2016/0127489 A1 | 5/2016 | Mcmullen et al. | |
| 2016/0239595 A1* | 8/2016 | Maes | G06F 9/5061 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

* cited by examiner

| Property | Description |
|---|---|
| Disaster Recovery | Asynchronous and Synchronous replication. Failover and failback. |
| Snapshot | Point-in-time scheduled snapshot + Restore |
| Replication Factor | Data availability and reliability |
| SSD Priority | IO and data priority for the performance SSD tier |
| Node Type | Association specific to SLA node type |

FIG. 3A

| Service Level Agreement | Disaster Recovery | Snapshot | Replication Factor | SSD Priority | Node Type |
|---|---|---|---|---|---|
| Gold | 1 hour | Frequent | 99.9999% (RF3) | 1 | Performance |
| Silver | Less Frequent | Less Frequent | 99.99% (RF2) | 2 | Capacity |
| Bronze | - | - | 99.9% (RF1) | 3 | Capacity |

FIG. 3B

ARCHITECTURE FOR IMPLEMENTING SERVICE LEVEL MANAGEMENT FOR A VIRTUALIZATION ENVIRONMENT

This present application claims the benefit of U.S. Provisional Application No. 61/988,803, filed May 5, 2014, which is hereby incorporated by reference in its entirety

BACKGROUND

A "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows multiple virtual machines to run on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines that are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Virtualization systems have now become a relatively common type of technology used in many company and organizational data centers, with ever increasing and advanced capabilities being provided for users of the system. However, the ability of company administrators to manage these virtualizations systems have thus far not kept up with the rapid advances made to the underlying systems themselves.

One area where this issue is particularly noticeable and problematic is with respect to the management of the storage infrastructure used to implement the virtualization system. In a conventional system, any changes that need to be made to management policies pertaining to storage components typically requires a complex process involving multiple administrators (e.g., an admin for the storage system, admin for the virtualization system, and/or possibly an admin of the network) at multiple locations on multiple admin consoles/platforms. For instance, a virtual desktop administrator may have use virtual desktop infrastructure (VDI) software that can instantiate and manage virtual machines, but typically VDI software is limited in its ability to reorganize or modify VM architectures not specifically tailored to the VDI software-type. For example, VDI software may have the ability to create Virtual Machines supported by a distributed storage architecture, but cannot access distributed storage architecture to effect changes, such as storage-level SLA policies, to the VMs. Thus, an administrator using a given VDI software solution may have to contact different administrators that control the storage-level architecture and ask them to effect the changes to the VMs at the storage level. This is a very inefficient process that can create logistics and coordination nightmares, and even situations where the desired policies cannot technically be implemented.

Therefore, there is a need for an improved approach to implement management of the storage infrastructure for virtualization systems.

SUMMARY

In some embodiments, an improved approach is provided for implementing a management environment for the storage infrastructure of a virtualization system. In those embodiments, the ability is provided—at a granular basis—to allow a user/administrator to configure and control the service levels for virtualization objects in a virtualization system, particularly for storage-related components.

Some embodiments provide the ability to specify service-level agreement (SLA) policies and QoS (Quality of Service) policies on the storage side at the time of VM provisioning or at a later time during Virtual Desktop management. This feature is very beneficial as it provides a flexibility for the administrator to enable and manage policies at the VM level or VM group level without having to involve the storage side admins, moving data, and/or going to another GUI or console.

In some embodiments, the storage controller exposes an API or GUI to create, read, update, delete (CRUD) datastores with user-specified policies. In another embodiment, the storage controller exposes APIs for external programs to interact with it and create and modify the above policies on a per VM or per virtual disk basis.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIG. 3A shows some service level properties that are applicable to storage-related components.

FIG. 3B shows a matrix of example service level agreement levels applicable to storage-related components.

DETAILED DESCRIPTION

Embodiments of the present invention provide an improved approach to implement a management environment for the storage infrastructure of a virtualization system. The invention provides the ability at a granular basis to allow a user/administrator to configure and control the service levels for virtualization objects in a virtualization system, particularly for storage-related components.

Figure 1:
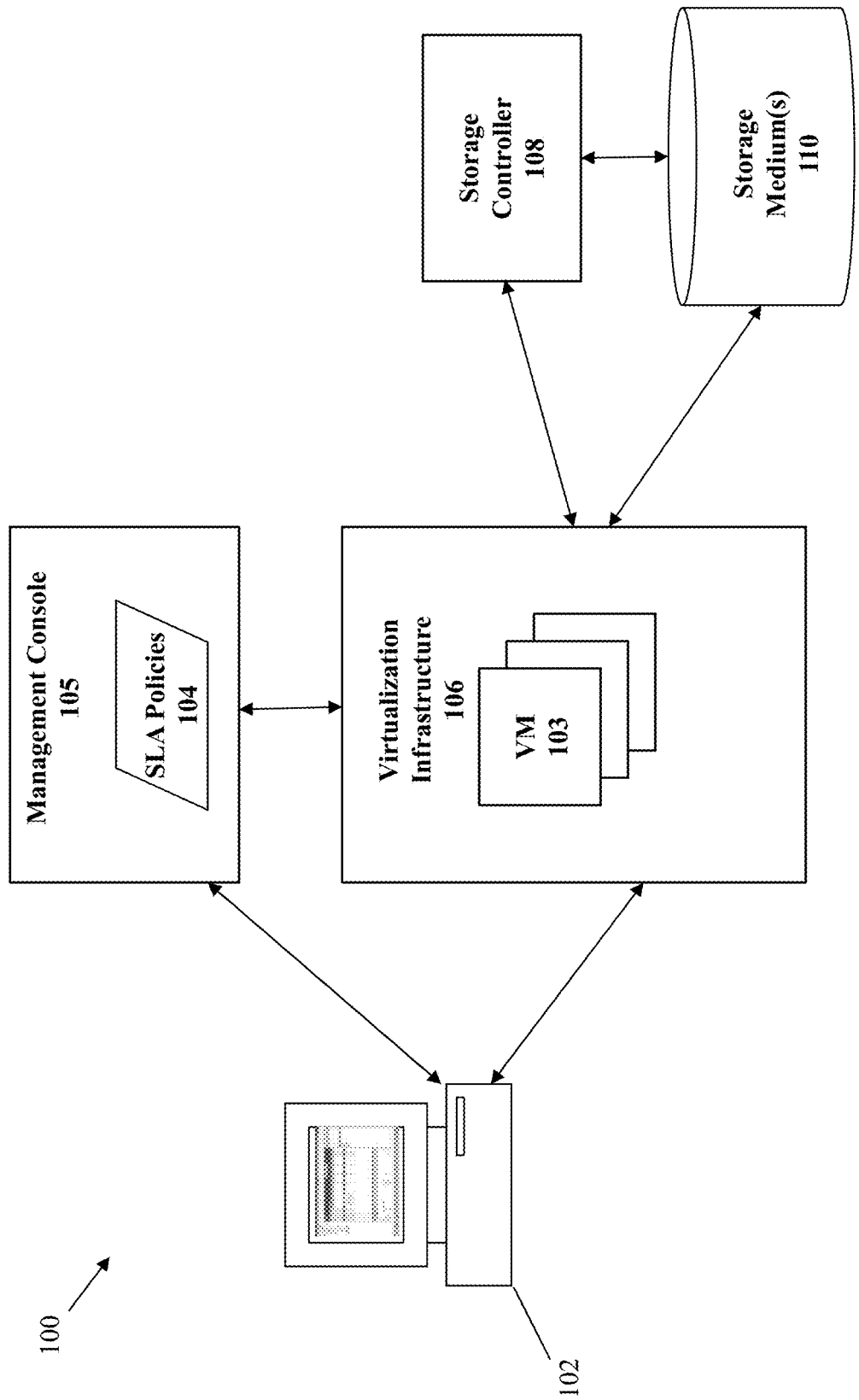
FIG. 1 illustrates a system to implement a virtualization management console according to some embodiments.

FIG. 1 illustrates a virtualization system 100 to implement a virtualization management console 105 according to some embodiments of the invention. The virtualization system 100 includes one or more users that may use one or more user stations 102 to operate or access the virtualization system 100, including a virtualization management console 105. The user station 102 comprises any type of computing station that may be used to operate or interface with the virtualization system 100. Examples of such user stations include, for example, workstations, personal computers, or remote computing terminals. The user station 102 comprises a display device, such as a display monitor, for displaying a user interface to users at the user station. In some embodiments, the display device may be used to access or manage the virtualization system 100 through locally run software or Internet browser based software (e.g., browser accessed cloud applications). The user station 102 also comprises one or more input devices for the user to provide operational control over the activities of the virtualization system 100, such as a mouse or keyboard to manipulate a pointing object in a graphical user interface to generate user inputs to the enterprise application and/or social networking application.

The virtualization system 100 includes virtualization infrastructure 106, comprising any processing components necessary to implement and provision one or more VMs 103 (e.g., virtual machines, virtualized computers, Linux containers). In some embodiments, virtualization infrastructure 106 may comprise, for example, a hypervisor that allocates hardware resources to run VMs 103 on a desired virtual operating system. In some embodiments, the hypervisor does not need to be modified or customized to work the virtualization system 100. Instead, the hypervisor may manage service virtual machines, explained in further detail below, which may perform policy management operations, such as changing access policies or service-level policies for the virtual machines.

In some embodiments, virtualization system 100 includes a virtualization management console 105. The virtualization management console 105 provides an interface that permits an administrator to manage and administer the operation of the virtualization system. In some embodiments, one or more policies 104 (e.g., management policies) are maintained to control and configure the storage system used by components within the virtualization system. These policies 104 may include, for example, policies pertaining to Service Level Agreements (SLAs) that may specify QoS (Quality of Service) for storage related components, as explained in further detail below.

As just one example, consider a management environment that is used to manage virtual desktops in a virtualization system. In contrast to past approaches, the virtualization system 100 provide the ability to specify QoS (Quality of Service) on the storage side at the time of VM provisioning and also at a later time during Virtual Desktop management. This feature is very beneficial as it provides a flexibility for the administrator to decide the QoS on a per Virtual Desktop or on a per group of Virtual Desktops without having to involve the storage administrators or going to another GUI or console, both of which create delays and inefficiencies in virtualization system management.

Data for the VMs 103, such as vDisks, are stored in a tangible computer readable storage device 110. The computer readable storage device 110 comprises any combination of hardware and software that allows for ready access to the data that is located at the computer readable storage device 110. A storage controller 108 is used to manage the access and operation of the computer readable storage device 110. As explained, in some embodiments the storage controller 108 may be a service virtual machine that can host or access the management console and perform storage controller operations, such as changing SLA policies for the VMs 103.

In one embodiment, the storage controller exposes an API or GUI to create, read, update, delete (CRUD) datastores in the computer readable storage device 110 with policies 104 (e.g., user-specified policies). For example, a first storage object can be created with no compression or dedupe, high replication, disaster recovery with low RPO/RTO, higher storage QoS in terms of iops, latency, and SSD tier reservation. A second storage object could be created with high compression and dedupe, no disaster replication or backups, low QoS, and maybe fewer replicas. A third storage object could be on non-persistent storage. VMs assigned to the storage objects inherit the storage objects policies. For example, a VM associated with the first storage object above would exhibit no compression or dedupe, high replication, disaster recover with low RPO/RTO, higher storage QoS in terms of iops, latency, and SSD tier reservation.

These storage objects are then exposed to the Virtual Desktop management software, which will provide an option to the admin (e.g., VDI admin) to select the target storage object when the admin is provisioning one or more virtual desktops. As explained, the act of placing a virtual machine's virtual disk on a target storage object automatically lends to the VM the policies set for the datastore. The policies that are set on the datastore can optionally be shown on virtual desktop management console and optionally allowed to be modified from the virtual desktop management console as well.

In another embodiment, the storage controller exposes APIs for external programs to interact with it and create and modify the above policies on a per VM, per datastore or storage object, or per virtual disk basis. For example, an external program may be a Virtual Desktop management application, which allows a user to specify the policies on a per-VM (per-VDisk) basis at the time of VM creation. In some embodiments, a VM may be created by talking to the storage controller (e.g., service virtual machine) to create virtual disks (e.g., vDisks) with specified policies, and also talking to a hypervisor through the same or separate API to create a VM with the created virtual disks. As explained in further detail below, the policies on the virtual disks, datastores, or VMs in the datastore could also be modified at later stage from the Virtual Desktop management application. The Virtual Desktop management application can also allow the creation of policy sets for convenience such that when a VM is provisioned the admin can just select a policy set to apply. Later this policy set can be switched with another policy set or the one or more VM or only some policies in the policy set may be overridden. The storage or hypervisor API may allow CRUD operations of these policies sets, or alternatively, these policy sets can be managed solely in the virtual desktop management console.

While the storage controller is shown as a separate component in this figure, it is noted that any suitable storage controller configuration may be employed. For example, in some embodiments, the storage controller can be implemented as a virtual machine or virtualized computer (e.g., Linux container application), as described in more detail below.

Figure 2:
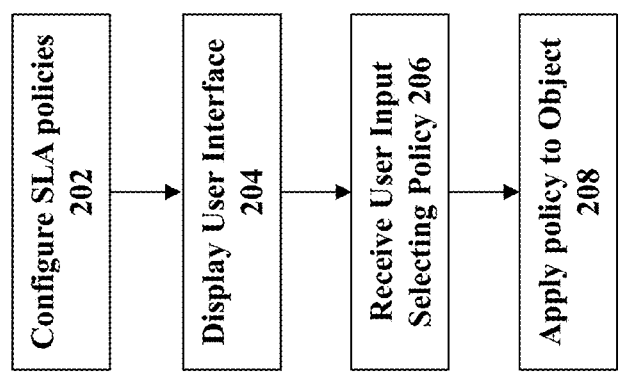
FIG. 2 shows a high level flowchart of an approach that can be taken to implement some embodiments.

FIG. 2 shows a high level flowchart of an approach for implementing virtualized computer architecture management, as according to some embodiments. At 202, one or more SLA policies are configured for the system. The SLA policies are configurable to address different types of service level properties and various levels of service level agreements.

FIG. 3A shows some example service level properties that are applicable to storage-related components. The "Disaster Recovery" property is configurable, for example, to address options and settings to perform replication, failover, and failback, including methods such as synchronous and asynchronous replication (e.g., VM, vDisk, write/read replication). The "Snapshot" property is configurable, for example, to address scheduling of snapshots and/or restoring from a snapshot. The "Replication Factor" property is configurable, for example, to address the options and use of replication to provide data availability and reliability. The "SSD Priority" property can be used, for example, to configure I/O and data priority for usage of SSD storage components. The "node type" property can be used, for example, to associate nodes to performance or capacity parameters.

FIG. 3B shows a matrix of some example service level agreement levels applicable to storage-related components. This example matrix includes three different levels of SLA policies, with differing configurations for various storage-related properties for each SLA policy. The "Gold" policy level provides the highest levels of service guarantees for each of the service level properties, the "Silver" policy level which provides an intermediate level of service guaranties, and the "Bronze" policy level provides the lowest tier of service guaranties. The service level properties, may include, for example, disaster recovery backup/recovery parameters, snapshot parameters, replication factor parameters, SSD priority parameters, and node type parameters (e.g., whether a node is performance or capacity focused).

Returning back to FIG. 2, the next action at 204 is to display a user interface to the user at the management console that includes interface elements for permitting the user to configure and apply the SLA policies. At 206, upon control of the interface by the user, user inputs may be received by the console that specify the specific action to be taken with respect to a given SLA policy as applied to a storage component.

Figure 4:
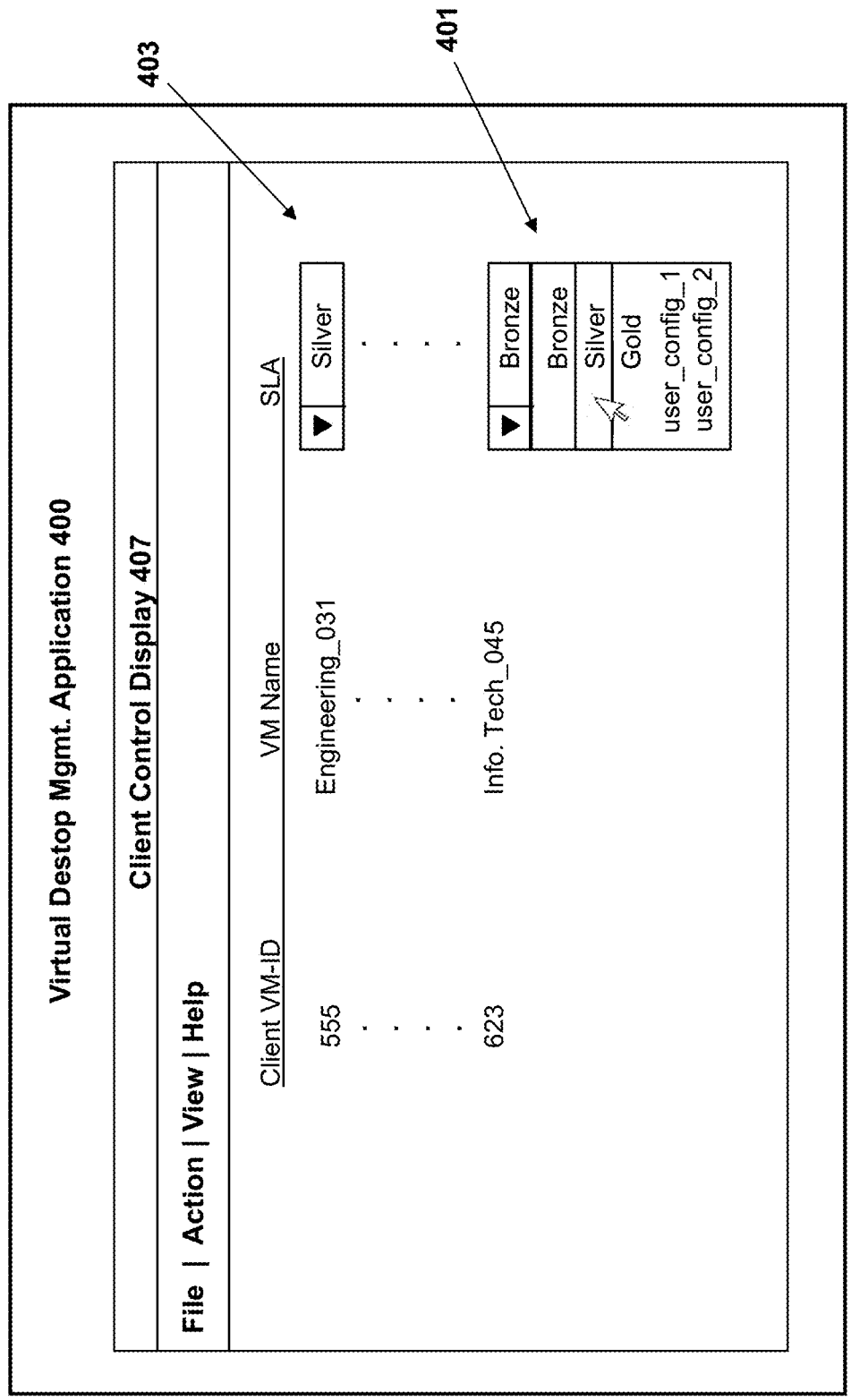
FIG. 4 illustrates an example interface that can be used to implement a management console, as according to some embodiments.

FIG. 4 illustrates an example interface or control display 407 that can be used to implement a management console according to some embodiments of the invention. This interface may be displayed via virtual desktop management application 400 and can be used to control or manage a list of virtual machines within the virtualization system. For any of the listed virtual machines, display objects in the user interface console area 403 can be configured to display and modify the policy settings (e.g., service level settings) for the virtual machines. For example, portion 401 comprises a drop-down box display object, which displays a selection of configured policies, such as Gold, Silver, Bronze, or other user configurable policies (e.g., user_config_1, user_config_2). In response to a selection (e.g., the mouse-icon selecting "Silver") being made from the drop-box object, the virtual desktop management application 400 can effectuate the policy changes on the backend through one or more APIs, as according to some embodiments.

Returning back to FIG. 2, action 208 is taken to implement the selected SLA policy for a given virtualization component. As noted, the SLA policies are configurable and applicable to any suitable level of granularity of objects in the system, such as at the granularity of the VM.

Figure 5A:
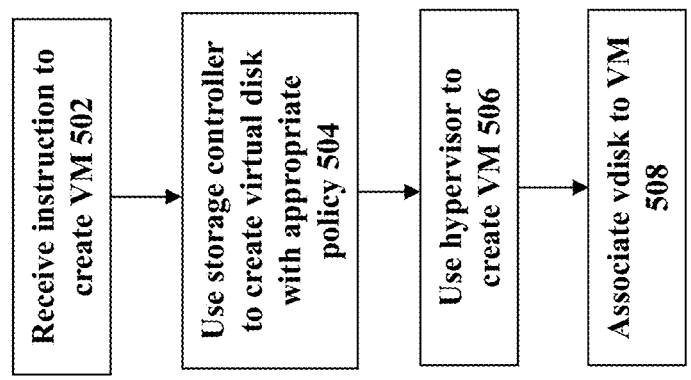
FIG. 5A shows a flowchart of an approach to implement a SLA policy for a selected VM at its creation time.

FIG. 5A shows a flowchart of an approach to implement a SLA policy for a selected VM at creation time, as according to some embodiments. At 502, an instruction is received to create a VM. For example, a virtual desktop management application at a user station may issue a command to create a VM. At 504, a storage controller is used to create one or more virtual storage objects with the appropriate policy. These storage objects may be implemented, for example, as virtual disks. These virtual disks are created having the properties associated with the appropriate SLA policy. For example, consider a SLA policy that requires a replication factor of "2". When the virtual disk is created, that virtual disk will be created with that required replication factor (e.g., replicated at two other locations). At 506, the hypervisor is used to create the VM. Thereafter, at 508, the vDisk having the required SLA properties is associated with the newly created VM. It is noted that the exact order of the steps in the above flow does not need to be in the specific order shown in FIG. 5. For example, rather than first creating the vDisk and then creating the VM, the VM could be created first followed by creation of the vDisks.

Figure 5B:
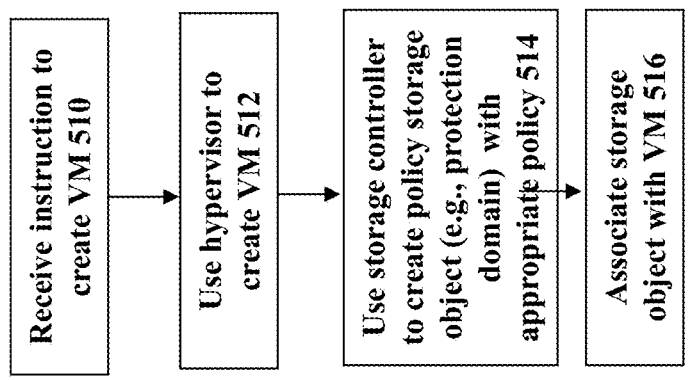
FIG. 5B shows a flowchart of an alternative approach for implementing a SLA policy for a selected VM, as according to some embodiments.

FIG. 5B shows an alternative approach that illustrates optional ordering and virtual storage objects, as according to some embodiments. At 510, an instruction is received to create a VM. For example, the virtual desktop management application at a user station may issue a command to create a VM. At 512, a hypervisor can create the VM. At 514, a storage controller is used to create one or more virtual storage objects, with appropriate policies. The virtual storage object, in some embodiments, corresponds to a protection domain (e.g., policy grouping or domain, VM grouping)

that allows VMs associated with a given domain to be operated on as a single entity from a user interface. In this way, the VMs associated with the storage object can be manipulated by manipulating the protection domain.

In some embodiments, individual VMs or groups of VMs can be managed as a single entity with the same recovery point objective (RPO)). For example, if a SLA associated with a group of VMs is to be modified, the modifications may be performed (e.g., through the user interface) by adjusting the parameters of the protection domain, thereby effecting SLA changes for all the associated VMs.

In some embodiments, protection domains have configured set(s) of rules and/or parameters for virtualization management policies, access policies, or other configured parameters. Further, protection domains may be assigned any rules and/or parameters associated with or pertaining to SLAs. For example, protection domains may be configured to have different replication schedules or a same schedule but with other different replication parameters, such as replication to remote sites.

When a VM is associated with a specified protection domain, the VM inherits the policies of that protection domain. At 516, the storage object (e.g., protection domain) is associated with the VM and inherits the storage objects policies and/or parameter settings.

Figure 5C:
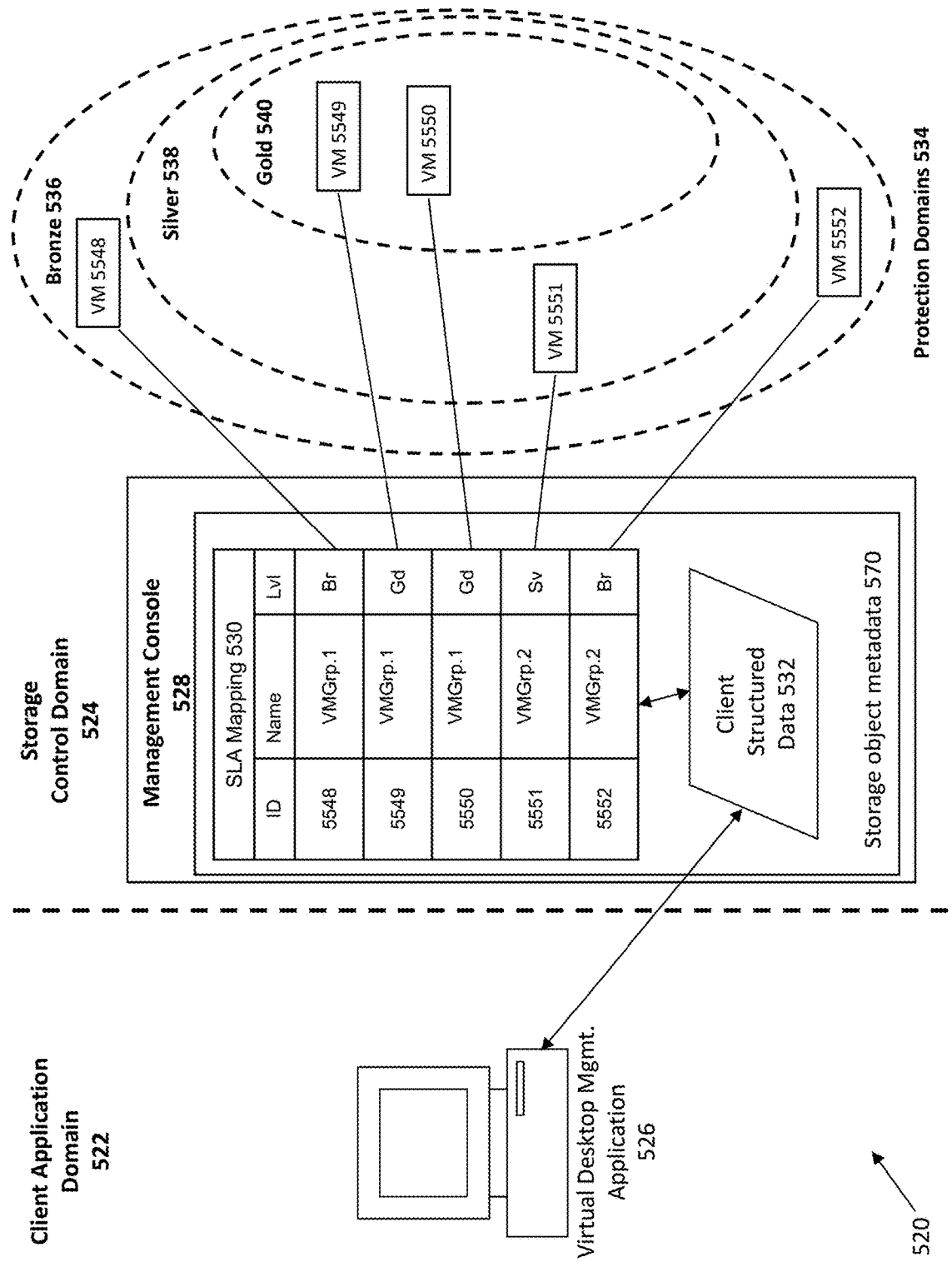
FIG. 5C shows a system for implementing SLA policies for a plurality of VMs, as according to some embodiments.

FIG. 5C illustrates an example system 520 implementing the above approaches. On a client application domain 522, a user station runs a virtual desktop management application 526 (e.g., client admin console), which may be configured to create and distribute virtual machines, in an enterprise infrastructure, for example. At the storage level, the virtual machines are managed on a storage control domain 524 that the virtual desktop management application has access to but does not manage. For example, in some implementations, the virtual desktop management application can create or distribute virtual machines to clients, however the virtual desktop management application does not have management access to the server that stores the VMs at the storage-level (e.g., within the storage control domain 524). A storage-level management console 528 may be implemented to control and/or manage the VMs within the storage control domain 524.

The management console 528 comprises storage object metadata 570, such as first metadata structure comprising a SLA mapping 530 and second metadata structure comprising a client structured mapping 532. The SLA mapping 530 may comprise a complete list SLA policy data, such as which VMs are created, the various storage objects, and/or parameters of each storage object. As illustrated, the example SLA mapping 530 comprises data including: storage control domain identification data (e.g., "ID", which may be used as a key to identify a given VM within the storage control domain), virtual machine name data (e.g., "Name"), and associated virtual storage object data (e.g., "Lvl", level data), such as protection domains associated with an SLA. In particular, the mapping ID data identifies virtual machines associated with different storage objects, such as protection domains 534. For example, three protection domains 534 are illustrated, comprising a gold level 540, a silver level 538, and a bronze level 536. In this example, the three protection domains may correspond to the respective parameters/policies of Gold, Silver, and Bronze SLAs, as illustrated in FIG. 3A and FIG. 3B. Thus, ID 5548 identifies a virtual machine (VM 5548) that is associated with the Bronze level protection domain (e.g., Bronze 536), while ID 5550 identifies a virtual machine (VM 5550) that is associated or assigned to a different SLA policy, Gold. Further, though the storage objects are illustrated as nested protection domains 534 (e.g., where Gold may have the service-level of Silver, plus additional levels or service-level guarantees), one of ordinary skill in the art appreciates that the storage objects may be exclusive of one other, having non-overlapping policies and parameters.

The client structured mapping 532 comprises mapping data, as structured by the client or virtual desktop management application. In some embodiments, the client structured mapping data 532 corresponds to a subset of the full SLA mapping data. That is, for example, the SLA mapping 530 may correspond to a complete mapping of all virtual machines and associated policies (e.g., SLA policy storage objects), while client structured mapping 532 corresponds to a subset that that given client has access to. For example, a first company/department may have access and control the VMs in VMGrp.2 (e.g., see last two rows of SLA Mapping 530), but does not have access or control to the VMs in VMGrp.1, which may belong to different company/department. As such, only VMGrp. 2 data would be exposed in client structured mapping 532 (e.g., the full SLA mapping 530 may not be exposed to the client applications in the client application domain 522).

In some embodiments, the management console 528 provides an application programming interface (API) that is configured to work an API of the virtual desktop management application 526 to manage VM associations with protection domains. For example, the virtual desktop management application 526 can use the API interface to access the client structured mapping 532 metadata to issue service level management communication, such as a query, or SLA management command, that uses a client-side VM identifier. The management console 528 may receive the service-level communication, translate the client-side VM identifiers (e.g., in the client structured mapping 532) to identifiers in the SLA mapping 530 metadata. Using the SLA mapping data, the management console associate, or otherwise manage the VMs and protection domains 534. As such, the virtual desktop management application 526 can effectively conduct virtual machine service-level management for VMs at the storage level through the management console 528.

In some embodiments, the management console 528 may be accessed through a plug-in that is integrated into the virtual desktop management application 526 to provide access to the storage-control domain 524. The plug-in has a configuration interface, where a server (e.g., the management console 528) may be connected to by specifying the server, username, and password information.

The plug-in, or the management console 528 acting through the plug-in, may query the main virtual desktop management application 526 for a list of running virtual machines (e.g., virtual machines that the virtual desktop management application 526 is currently running) and transmit the list and associated data to the management console 528, where the data may be stored as client-structured data 532 and used in later operations by the management console to manage the VMs SLAB. Alternatively, the plug-in may query the virtual desktop management application 526 for the list of running virtual machines and send that data to the management console 528, asking the management console to provide data about what SLA policy each running virtual machine is currently associated. In turn, the management console 528 may receive the list of running virtual machines and map or match each virtual machine to its own list.

Figure 6A:
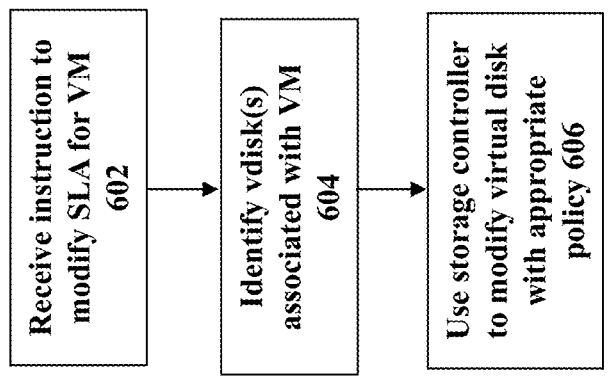
FIG. 6A shows a flowchart of an approach to modify the SLA policy for a selected VM after the VM has been created, as according to some embodiments.

FIG. 6A shows a flowchart of an approach to modify the SLA policy for a selected VM after it had already been created. At 602, an instruction is received to modify the SLA for the VM. At 604, identification is made of the policy storage object (e.g., protection domain, vDisk) associated with the VM. Thereafter, at 606, the storage controller is used to modify the properties associated with the identified vDisks so that they correspond to the selected SLA policy.

Figure 6B:
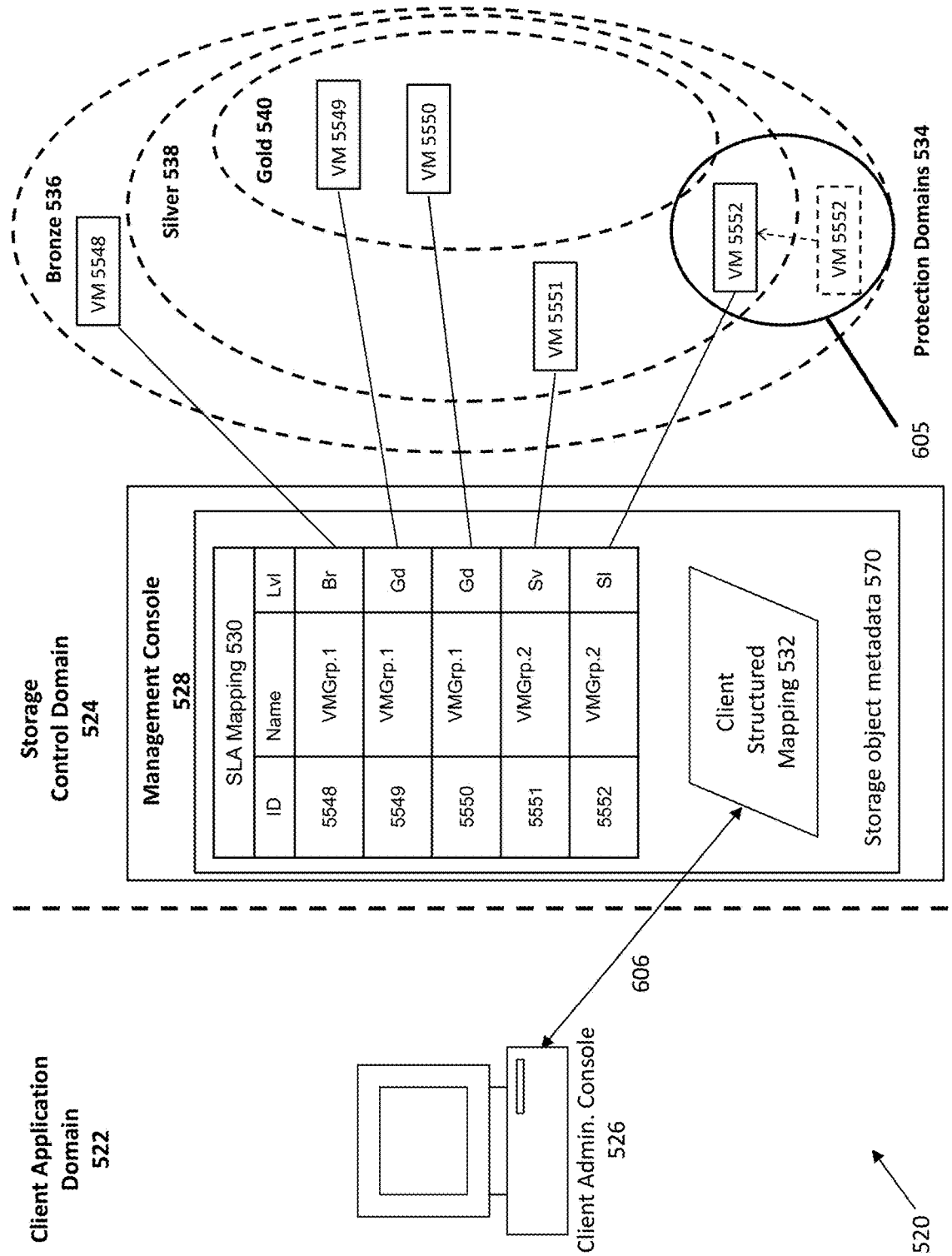
FIG. 6B illustrates a system for modifying the SLA policy for a selected VM after the VM has been created, as according to some embodiments.

FIG. 6B illustrates the above modification process at the system level, with reference to FIG. 4. In FIG. 4, the VM "Info. Tech 045" (with a Client VM-ID of 523) is to have its SLA policy changed from one level to another level (e.g., Bronze to Silver). The change can be made through the control display 407 (e.g., client controlled display) by selecting "Silver" from the drop-box (e.g., see portion 401). Referring back to FIG. 6B, the virtual desktop management application 526 then sends a service-level management communication 606, comprising a SLA directive (e.g., a change SLA policy directive) to the management console through the API interface. In some embodiments, SLA directives comprise instructions for modifying the SLA policy assigned to a given VM (e.g., assigning a new VM a new SLA policy, modify a SLA policy assigned to a VM or transfer a VM to a different storage object thereby changing the SLA policy for that VM). While still in other embodiments SLA directives may correspond to queries or information gathering operations for analysis or use by the virtual desktop management application.

The management console receives the service-level management communication 606 and uses the storage object metadata 570 (e.g., client structured mapping 532 and SLA mapping 530) to identify the correct VM and associated data. For example, the Client VM-ID may correspond to the VM 5552. The management console can then re-associate VM 5552 from the bronze level to the silver level by transferring VM 5552 from the Bronze protection domain 536 to the Silver protection domain 538 (see transfer call-out 605). After VM 5552 is transferred to Silver, it inherits the SLA parameters of the silver level protection domain 538. As such, VMs may be moved between different protection domains by modifying metadata (e.g., storage object metadata 570), without the need for any data, such as VMs or vDisks, to be moved or copied. The management console 528 may then send an acknowledgement of the transfer to the client admin console for display.

While the above description is specific with respect to application and configuration of SLA policies for storage-related components, it is noted that the above-described techniques are applicable to any virtualization component (and not limited to just storage-related components). For example, in a VDI (virtual desktop infrastructure) environment, the present invention can be used to manage and configure SLA policies for any object within the VDI environment.

Figure 7:
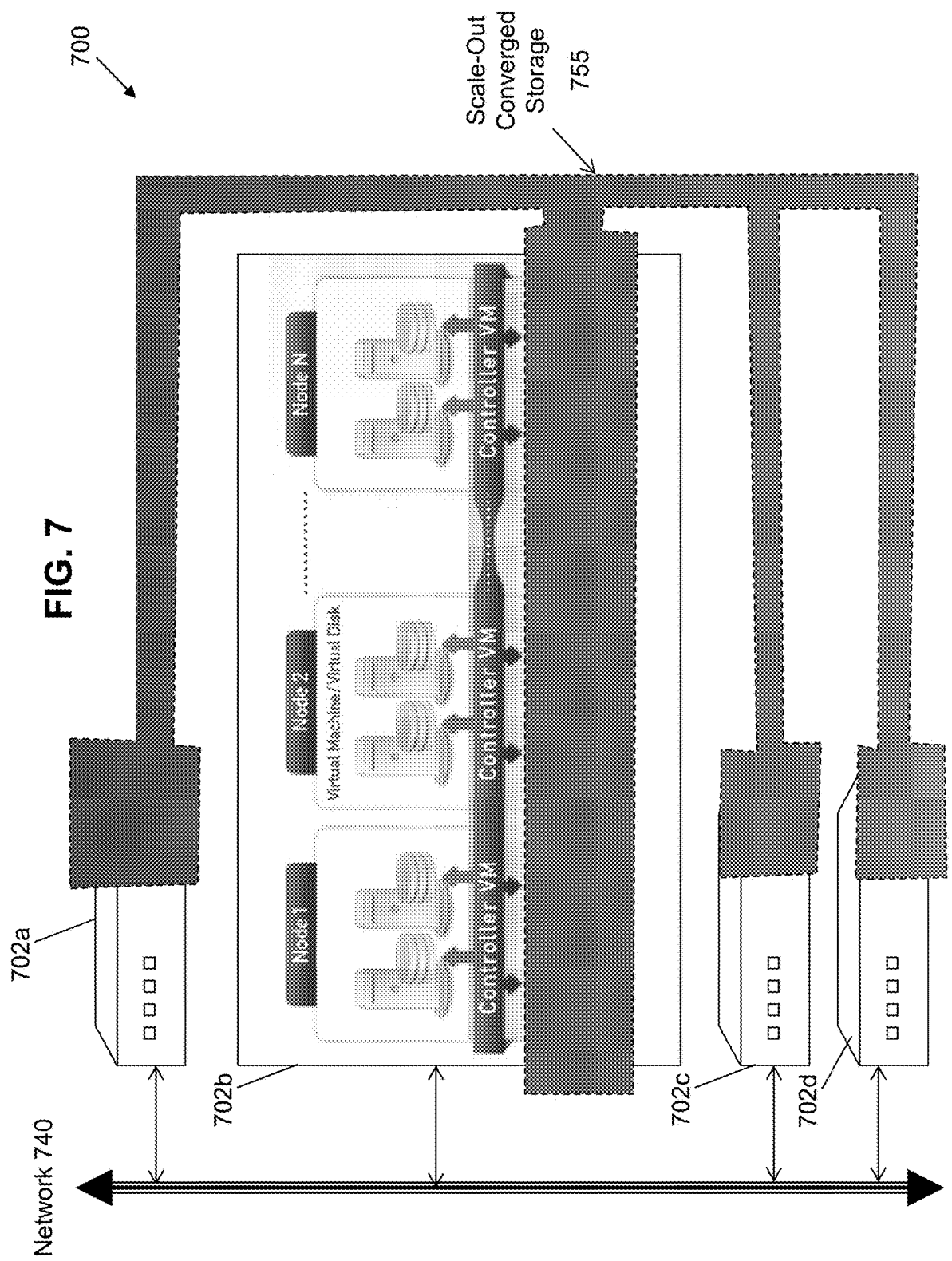
FIG. 7 shows an example storage architecture that can be used in a virtualization system.

The invention can be applied to any virtualization or storage architecture. FIG. 7 shows one example of storage architecture that can be used in a virtualization system having an integrated collection (or "cluster") 700 of virtualization appliances or "blocks" 702a, 702b, 702c, and 702d. Each of the blocks includes hardware and software to implement a virtualization solution. For example, block 702b is internally organized to include hardware and software to implement multiple virtualization nodes. Each node runs a standard hypervisor on hardware that contains processors, memory and local storage, such as a mix of SSDs and/or hard disk drives. Each node runs virtual machines just like a standard virtual machine host.

In addition, local storage from all nodes is virtualized into a unified storage pool, which is referred to herein as "scale-out converged storage" or "SOCS" 755. As described in more detail below, SOCS 155 acts like an advanced SAN that uses local SSDs and disks from all nodes to store virtual machine data. Virtual machines running on the cluster write data to SOCS as if they were writing to a SAN. SOCS is VM-aware and provides advanced data management features. This approach brings the data closer to virtual machines by storing the data locally on the system (if desired), resulting in higher performance at a lower cost. As discussed in more detail below, this solution can horizontally scale from a few nodes to a large number of nodes, enabling organizations to scale their infrastructure as their needs grow.

While traditional SAN solutions typically have 1, 2, 4 or 8 controllers, an n-node system according to the present embodiment has n controllers. Every node in the cluster runs a special virtual machine, called a Controller VM (or "service VM"), which acts as a virtual controller for SOCS. All Controller VMs in the cluster communicate with each other to form a single distributed system. Unlike traditional SAN/NAS solutions that are limited to a small number of fixed controllers, this architecture continues to scale as more nodes are added. In embodiments of the invention, the management console interacts with the controller VMs to configure the SLA policies for storage components.

Figure 8:
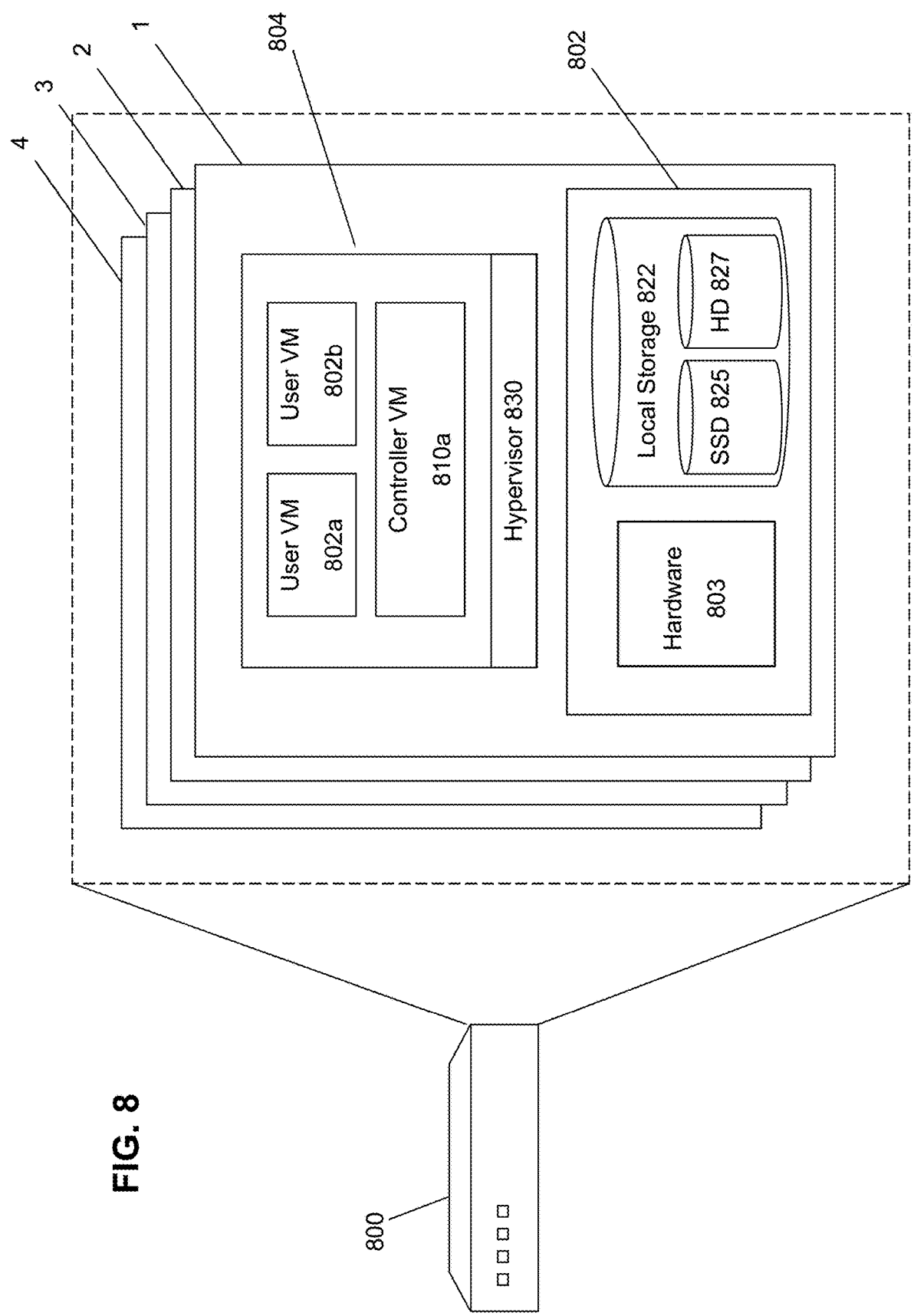
FIG. 8 illustrates a self-contained virtualization appliance.

As stated above, each block includes a sufficient collection of hardware and software to provide a self-contained virtualization appliance, e.g., as shown in FIG. 8. The example block 200 in FIG. 8 includes four nodes 1-4. Having the multiple nodes within a block allows both high performance and reliability. Performance is increased since there are multiple independent nodes to handle the virtualization needs of the system. Reliability is improved since the multiple nodes provide for redundancy in the event of a possible hardware or software error. Moreover, as discussed below, the software-based storage management solution allow for easy movement of data as the storage needs of the system changes.

Each node in the block includes both hardware components 802 and software components 804 to implement virtualization. Hardware components 802 include processing capacity (e.g., using one or more processors) and memory capacity (e.g., random access memory or RAM) on a motherboard 803. The node also comprises local storage 822, which in some embodiments include Solid State Drives (henceforth "SSDs") 825 and/or Hard Disk Drives (henceforth "HDDs" or "spindle drives") 827. Further, any combination of SSDs and HDDs may be used to implement the local storage 822.

The software 804 includes a hypervisor 830 to manage the interactions between the underlying hardware 802 and the one or more user VMs 802a and 802b that run client software. A controller VM 810a exists on each node to implement distributed storage management of the local storage 822, such that the collected local storage for all nodes can be managed as a combined SOCS.

Figure 9:
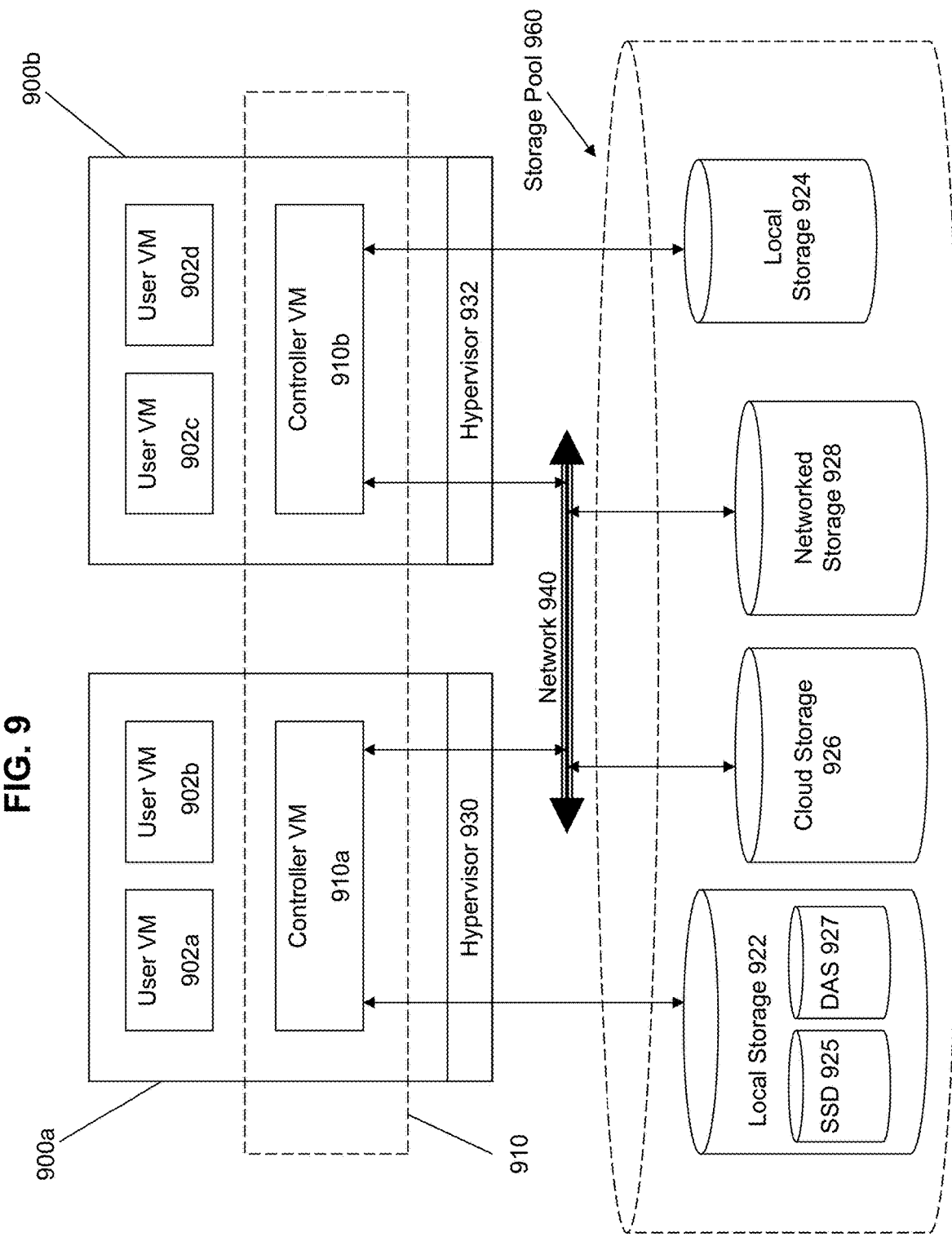
FIG. 9 illustrates an approach for implementing SOCS-based storage management in a virtualization environment, as according to some embodiments.

FIG. 9 illustrates an approach for implementing SOCS-based storage management in a virtualization environment according to some embodiments of the invention. The architecture of FIG. 9 can be implemented for a distributed platform that contains multiple nodes/servers 900a and 900b that manages multiple-tiers of storage. The nodes 900a and 900b may be within the same block, or on different blocks in a clustered environment of multiple blocks. The multiple tiers of storage include storage that is accessible through a network 940, such as cloud storage 926 or networked storage 928 (e.g., a SAN or "storage area network"). In addition, the present embodiment also permits local storage 922/924 that is within or directly attached to the server and/or appliance to be managed as part of the storage pool 960. As noted above, examples of such storage include any combination of SSDs 925 and/or HDDs 927. These collected storage devices, both local and networked, form a storage pool 960.

Virtual disks (or "vDisks") can be structured from the storage devices in the storage pool 960, as described in more detail below. As used herein, the term vDisk refers to the storage abstraction that is exposed by a Controller VM to be used by a user VM. In some embodiments, the vDisk is exposed via iSCSI ("internet small computer system interface") or NFS ("network file system") and is mounted as a virtual disk on the user VM. Each server 900a or 900b runs virtualization software, such as VMware ESX(i), Microsoft Hyper-V, or RedHat KVM. The virtualization software includes a hypervisor 930/932 to manage the interactions between the underlying hardware and the one or more user VMs 902a, 902b, 902c, and 902d that run client software.

Controller VM 910a/910b (also referred to herein as "service VMs") are used to manage storage and I/O activities. This is the distributed "Storage Controller" in the currently described architecture. Multiple such storage controllers coordinate within a cluster to form a single-system. The Controller VMs 910a/910b are not formed as part of specific implementations of hypervisors 930/932. Instead, the Controller VMs run as virtual machines above hypervisors 930/932 on the various nodes/servers 902a and 902b, and work together to form a distributed system 910 that manages all the storage resources, including the locally attached storage 922/924, the networked storage 928, and the cloud storage 926. Since the Controller VMs run above the hypervisors 930/932, this means that the current approach can be used and implemented within any virtual machine architecture, since the Controller VMs of embodiments of the invention can be used in conjunction with any hypervisor from any virtualization vendor.

Each Controller VM 910a-b exports one or more block devices or NFS server targets that appear as disks to the client VMs 902a-d. These disks are virtual, since they are implemented by the software running inside the Controller VMs 910a-b. Thus, to the user VMs 902a-d, the Controller VMs 910a-b appear to be exporting a clustered storage appliance that contains some disks. All user data (including the operating system) in the client VMs 902a-d resides on these virtual disks.

Significant performance advantages can be gained by allowing the virtualization system to access and utilize local (e.g., server-internal) storage 922 as disclosed herein. This is because I/O performance is typically much faster when performing access to local storage 922 as compared to performing access to networked storage 928 across a network 940. This faster performance for locally attached storage 922 can be increased even further by using certain types of optimized local storage devices, such as SSDs 925. Once the virtualization system is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 922. On the other hand, data that does not require fast access or which is accessed infrequently can be stored in the networked storage devices 928 or in cloud storage 926. In addition, the performance of the local storage can be further improved by changing the mix of SSDs and HDDs within the local storage, e.g., by increasing or decreasing the proportion of SSDs to HDDs in the local storage.

System Architecture

Figure 10:
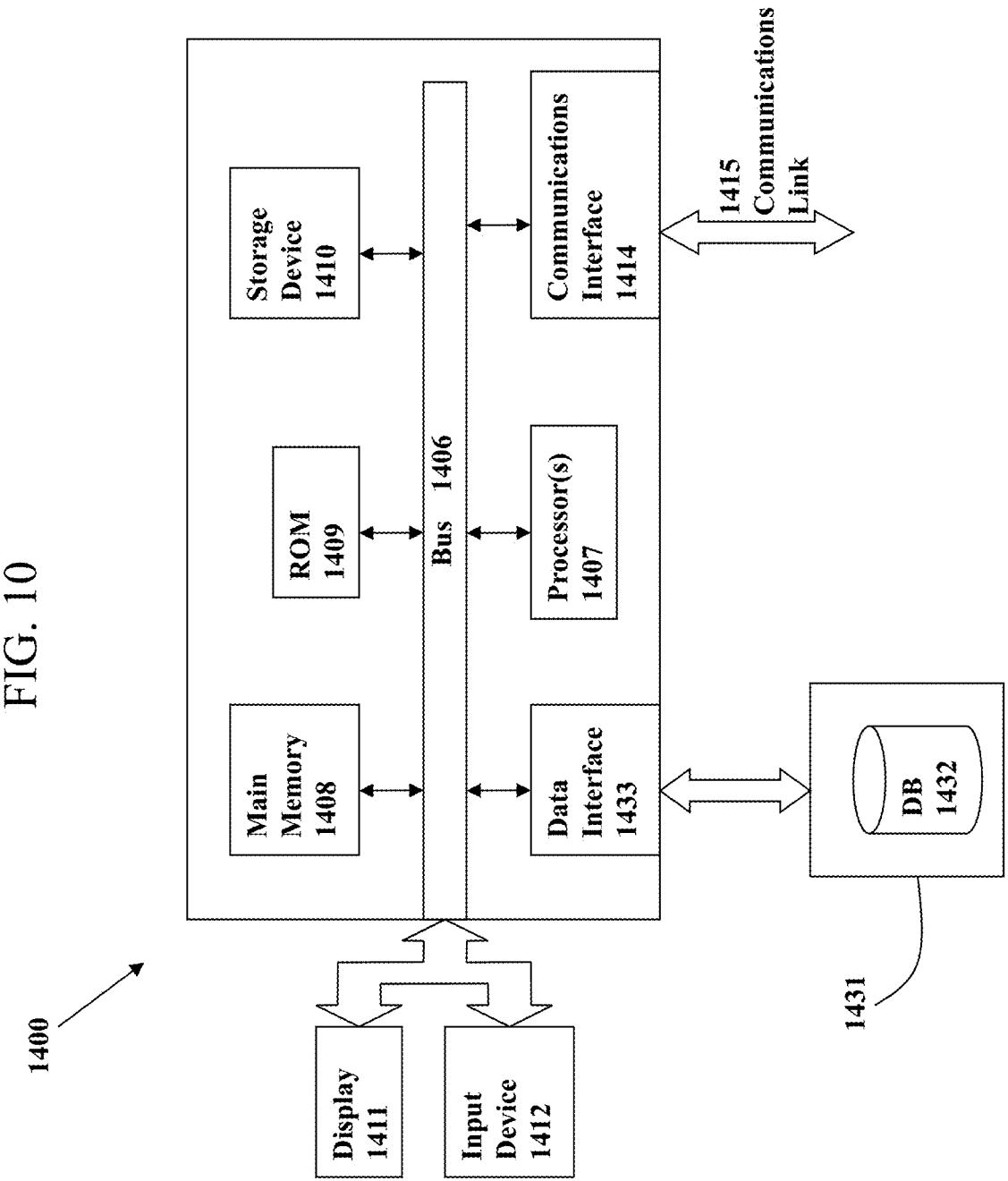
FIG. 10 is a block diagram of a computing system suitable for implementing some embodiments.

FIG. 10 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions.

However, the ordering of many of the described process actions may be changed without affecting the scope or operation of the invention. The specification and drawings are, accordingly, to be regarded in an illustrative rather than restrictive sense.

What is claimed is:

1. A method, comprising:
receiving service level metadata for storing, in a storage pool, virtual machine data of a virtual machine in a distributed environment,
the service level metadata correlating the virtual machine with a first protection domain under a first storage policy, and
a controller virtual machine executing as a separate virtual machine above a hypervisor and between the virtual machine and the storage pool;
changing the first storage policy associated with the virtual machine at least by modifying, by the controller virtual machine, the service level metadata associated with the virtual machine into modified service level metadata that corresponds to a second protection domain, wherein
modifying the service level metadata transfers the virtual machine from the first protection domain to the second protection domain, and
the virtual machine in the second protection domain inherits a second storage policy based at least in part upon the modified service level metadata.

2. The method of claim 1, wherein a first storage object is associated with the first protection domain under the first storage policy, a second storage object is associated with the second protection domain under the second storage policy, and the first and the second protection domains respectively correspond to respective service levels according to an SLA (service level agreement).

3. The method of claim 2, further comprising receiving a service-level management communication for changing the first storage policy to the second storage policy, wherein the service-level management communication comprises an instruction for changing an SLA policy for the virtual machine at least by transferring the virtual machine from the first storage object to the second storage object, and the first protection domain is exclusive of or nested within the second protection domain.

4. The method of claim 1, further comprising:
creating, at least by the controller virtual machine, a plurality of storage objects based at least in part upon a plurality of storage policies, the plurality of storage policies respectively corresponding to the plurality of storage objects for different storage properties of different service levels of storage services, wherein the service level metadata comprises domain identification data that identifies a specific protection domain to which a specific storage object of the plurality of storage objects pertains.

5. The method of claim 1, further comprising:
associating the virtual machine with a second storage object in the second protection domain by the controller virtual machine executing above the hypervisor, based at least in part upon the modified service level metadata.

6. The method of claim 1, wherein modifying the service level metadata comprises modifying a property associated with a first storage object in the first protection domain for the virtual machine based at least in part upon a mapping between the virtual machine and the first storage policy, and the first storage object comprises a virtual disk and corresponds to the first protection domain, the first protection domain comprising a plurality of virtual machines.

7. The method of claim 1, further comprising provisioning an application programming interface or a plugin to a client for the client to manage virtual machines and protection domains associated with the virtual machines, wherein the client comprises a virtual desktop management application that invokes, through at least the application programming interface or the plugin, at least the controller virtual machine to manage storage for a plurality of virtual machines in at least one protection domain as a single entity.

8. A system, comprising:
a computer processor to execute a set of program code instructions;
a memory to hold the set of program code instructions, in which the set of program code instructions comprises program code to perform:
receiving service level metadata for storing, in a storage pool, virtual machine data of a virtual machine in a distributed environment,
the service level metadata correlating the virtual machine with a first protection domain under a first storage policy,
a controller virtual machine executing as a separate virtual machine above a hypervisor and between the virtual machine and the storage pool;
changing the first storage policy associated with the virtual machine at least by modifying, by the controller virtual machine, the service level metadata associated with the virtual machine into modified service level metadata that corresponds to a second protection domain, wherein
modifying the service level metadata transfers the virtual machine from the first protection domain to the second protection domain, and
the virtual machine in the second protection domain inherits a second storage policy based at least in part upon the modified service metadata.

9. The system of claim 8, wherein a first storage object is associated with the first protection domain under the first storage policy, a second storage object is associated with the second protection domain under the second storage policy, and the first and the second protection domains respective correspond to respective service levels according to an SLA (service level agreement).

10. The system of claim 9, wherein the set of program code instructions further comprises the program code to receive a service-level management communication for changing the first storage policy to the second storage policy, wherein the service-level management communication comprises an instruction for changing an SLA policy for the virtual machine at least by transferring the virtual machine from the first storage object to the second storage object, and the first protection domain is exclusive of or nested within the second protection domain.

11. The system of claim 8, wherein the set of program code instructions comprises program code to perform:
creating, at least by the controller virtual machine, a plurality of storage objects based at least in part upon a plurality of storage policies, the plurality of storage policies respectively corresponding to the plurality of storage objects for different storage properties of different service levels of storage services, wherein the service level metadata comprises domain identification data that identifies a specific protection domain to which a specific storage object of the plurality of storage objects pertains.

12. The system of claim 8, wherein the set of program code instructions comprises program code to perform:

associating the virtual machine with a second storage object in the second protection domain by the controller virtual machine that executes above the hypervisor, based at least in part upon the modified service level metadata.

13. The system of claim 8, wherein the set of program code instructions for modifying the service level metadata further comprising the program code which, when executed by the computer processor, causes the computer processor to modify a property associated with the first storage object for the virtual machine based at least in part upon the second storage policy and a client structured mapping, and the first storage object comprises a virtual disk and corresponds to the first protection domain, the first protection domain comprising a plurality of virtual machines.

14. The system of claim 8, wherein the set of program code instructions further comprises the program code to perform: provisioning an application programming interface or a plugin to a client for the client to manage virtual machines and protection domains associated with the virtual machines, wherein the client comprises a virtual desktop management application that invokes, through at least the application programming interface or the plugin, at least the controller virtual machine to manage storage for a plurality of virtual machines in at least one protection domain as a single entity.

15. A computer program product embodied on a non-transitory computer readable medium, the non-transitory computer readable medium having stored thereon a sequence of instructions which, when executed by a processor causes the processor to execute a set of acts, the set of acts comprising:

receiving service level metadata for storing, in a storage pool, virtual machine data of a virtual machine in a distributed environment,
 the service level metadata correlating the virtual machine with a first protection domain under a first storage policy, and
 a controller virtual machine executing as a separate virtual machine above a hypervisor and between the virtual machine and the storage pool;
changing the first storage policy associated with the virtual machine at least by modifying, by the controller virtual machine, the service level metadata associated with the virtual machine into modified service level metadata that corresponds to a second protection domain, wherein
 modifying the service level metadata transfers the virtual machine from the first protection domain to the second protection domain, and
 the virtual machine in the second protection domain inherits a second storage policy based at least in part upon the modified service level metadata.

16. The computer program product of claim 15, wherein first storage object is associated with the first protection domain under the first storage policy, a second storage object is associated with the second protection domain under the second storage policy, and the first and the second protection domains respectively correspond to an SLA (service level agreement).

17. The computer program product of claim 16, the set of acts further comprising receiving a service-level management communication for changing the first storage policy to the second storage policy, wherein the service-level management communication comprises an instruction for changing an SLA policy for the virtual machine at least by transferring the virtual machine from the first storage object to the second storage object, and the first protection domain is exclusive of or nested within the second protection domain.

18. The computer program product of claim 17, wherein the set of acts further comprising:

creating, at least by the controller virtual machine, a plurality of storage objects based at least in part upon a plurality of storage policies, the plurality of storage policies respectively corresponding to the plurality of storage objects for different storage properties of different service levels of storage services, wherein the service level metadata comprises domain identification data that identifies a specific protection domain to which a specific storage object of the plurality of storage objects pertains.

19. The computer program product of claim 15, the set of acts further comprising:

associating the virtual machine with a second storage object in the second protection domain by the controller virtual machine executing above the hypervisor, based at least in part upon the modified service level metadata.

20. The computer program product of claim 15, the set of acts further comprising provisioning an application programming interface or a plugin to a client for the client to manage virtual machines and protection domains associated with the virtual machines, wherein the client comprises a virtual desktop management application that invokes, through at least the application programming interface or the plugin, at least a controller virtual machine to manage storage for a plurality of virtual machines in at least one protection domain as a single entity.

* * * * *